T. GORDON & H. W. SIMPSON.
ROCK DRILL.
APPLICATION FILED JULY 23, 1918.
1,301,121.
Patented Apr. 22, 1919.
2 SHEETS—SHEET 1.
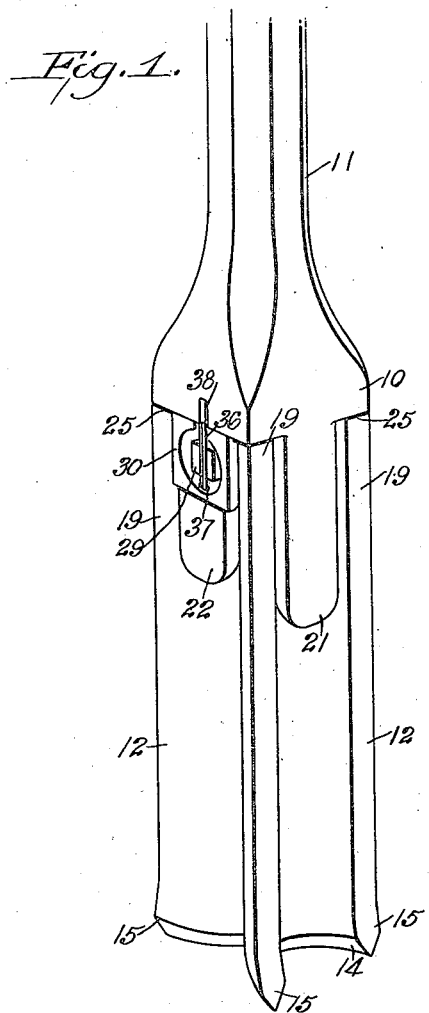
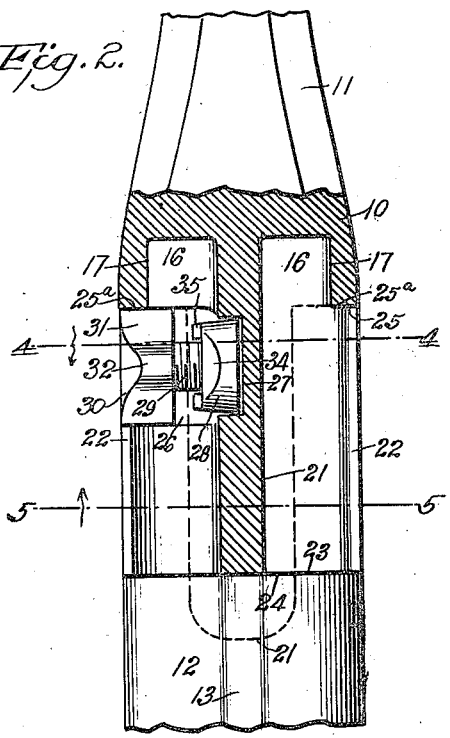
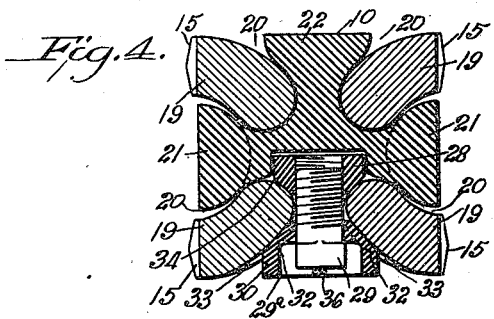
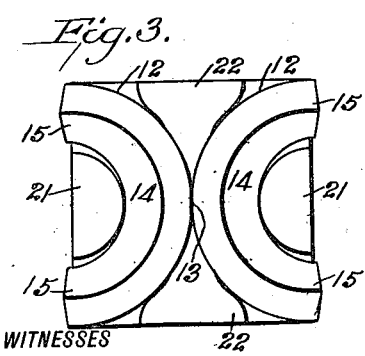
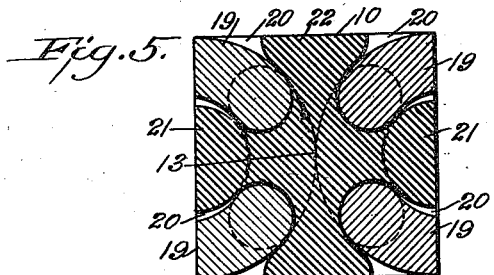
INVENTORS
Thomas Gordon
Hugh W. Simpson
BY
ATTORNEYS

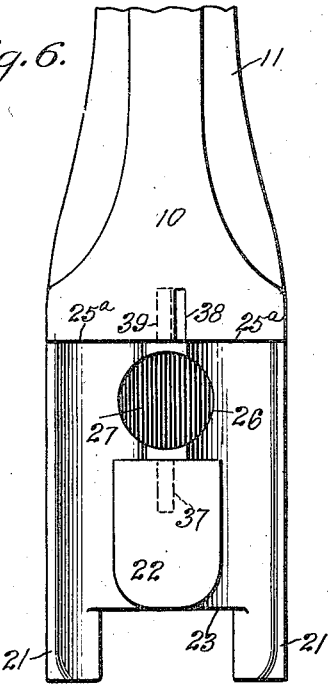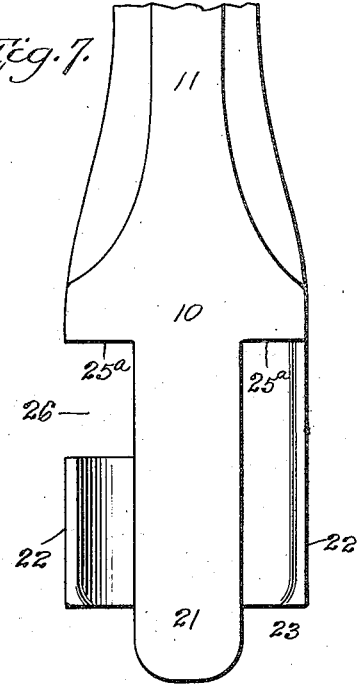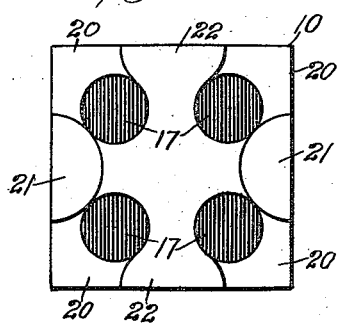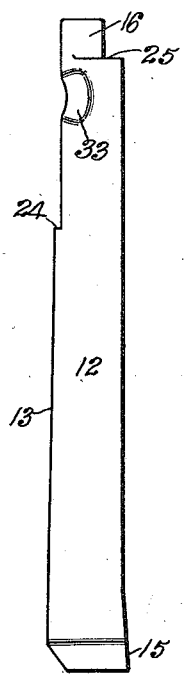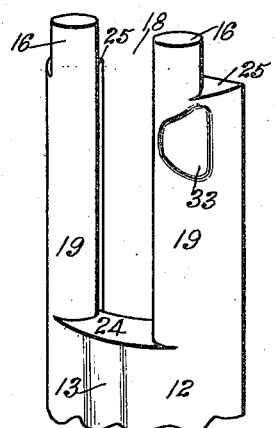

UNITED STATES PATENT OFFICE.

THOMAS GORDON AND HUGH WILLIAM SIMPSON, OF PARSON'S BRIDGE, VANCOUVER ISLAND, BRITISH COLUMBIA, CANADA.

ROCK-DRILL.

1,301,121.　　　　　Specification of Letters Patent.　　Patented Apr. 22, 1919.

Application filed July 23, 1918.　Serial No. 246,387.

*To all whom it may concern:*

Be it known that we, THOMAS GORDON and HUGH W. SIMPSON, subjects of the King of Great Britain, and residents of Parson's Bridge, Vancouver Island, Province of British Columbia, Dominion of Canada, have invented a new and Improved Rock-Drill, of which the following is a description.

Our invention relates to rock drills, and more particularly relates to miners' machine drills employed in mines and in harbor work where extra long drill rods are required.

The general object of our invention is to provide a drill of the indicated character improved in various particulars, whereby certain important advantages and results are obtained among which are the following: The drill bits are detachably secured to the drill socket in a practical manner so that short bits can be employed involving the minimum amount of steel to keep a given number of machines going by providing 2, 4, or other practical number of sets of bits for each drill. As no welding is involved in the cutting bits a much higher grade of tool steel can be used; the need of continually hoisting the entire drill for sharpening is obviated; the detached bits are light to handle and easily sharpened, thereby saving coal and labor in the sharpening; and the bits are made concavo-convex in cross section and set back to back whereby the cut paths traversed by the respective bits in the turning of the drill will intersect each other so that the drill will cut faster than the ordinary drill and there will be less trouble in seamy or jointy rock as the drill will not stale or lock in the rock joints. Furthermore, the manner of fastening the drill bits serves to firmly hold them in position but permits of the drills being easily and quickly removed from the drill socket.

Reference is to be had to the accompanying drawings forming a part of this specification, it being understood that the drawings are merely illustrative of one example of the invention.

Figure 1 is a perspective view of the lower portion of a drill equipped with our improved bits and locking means;

Fig. 2 is a partly sectional side elevation at the juncture of the bits and socket;

Fig. 3 is a front end view of the drill;

Fig. 4 is a cross section on the line 4—4, Fig. 2;

Fig. 5 is a cross section on the line 5—5, Fig. 2;

Fig. 6 is a side elevation of the drill socket;

Fig. 7 is a side elevation of the drill socket taken at right angles to Fig. 6;

Fig. 8 is an end view of the drill socket;

Fig. 9 is a side elevation of one of the drill bits;

Fig. 10 is a perspective view of the upper portion of one of the drill bits.

In carrying out our invention in practice, in accordance with illustrated example, a drill socket designated generally by the numeral 10 is provided on the lower end of the drill rod or shank 11 and two separate bits 12 are provided which are attachable to the socket. The two bits 12 are semi-circular in cross section and are disposed back to back, the drills in practice being in actual contact with each other along a flattened surface 13 provided in each drill as indicated in Figs. 3 and 10. The cutting edges 14 of the drill bits being semi-circular as the drill is turned, the respective bits will traverse intersecting paths. Each bit 12 at the corners 15, that is to say, those portions at the sides of the bit adjacent to its cutting edge 14, are swelled or extended, and with the semi-circular cutting edge continued through said swelled or extended corners 15, clearance for the bits and socket is insured.

The head or rear end of each bit is formed with a pair of tenons 16 fitting mortises 17 in the socket 10. The head of the bit is vertically slotted as at 18 so that the tenons of a pair are respectively on arms 19 at the sides of the slot. To receive and accommodate the arms 19 of the drill bit, the socket 10 is formed with pairs of vertical grooves 20 at the corners, thereby producing ribs 21 at two opposite sides of the drill and ribs 22 opposite each other at the two remaining sides. The ribs 21 are preferably carried below the remaining ribs 22 to more readily position and guide the drill bits into position. The slotting of the drill bit as at 18 produces a shoulder 24 at the base of the slot which will lie against the flat forward end surface 23 of the socket. Shoulders 25 are produced also on the drill bit at the bases of the tenons 16 to lie opposite to similar shoulders 25$^a$ on the socket.

In order to lock the drill bits to the socket the following means is provided: The socket is cut away transversely at the upper portion of one of the ribs 22 for example as at 26 and depression 27 is produced in the material of the socket at the bottom of the cutaway portion 26. Said depression receives removably a nut 28 adapted to be engaged by a transverse bolt 29. Thus, the nut 28 will lie in a position so that when the drill bits 12 are inserted in the socket an adjacent arm 19 on each drill bit will slide over said nut to overlie the same, thus retaining the nut in position. A clamp head 30 is employed on the bolt 29 outside of the arms 19, said clamp head having a bore through which the shank of the bolts may pass, so that the head of the bolt bears against the clamp in the countersink 29ᵃ thereof. Thus, by the tightening up of the bolt, the respective arms 19 at opposite sides thereof will be clamped firmly between the nut 28 and the clamp head 30. At opposite sides 31 of the clamp 30 rounded ribs or protuberances 32 are produced and these are adapted to be received in depressions 33 in the adjacent arms 19 to provide an interengagement of said arms and clamp. The nut 28 is beveled at opposite sides as at 34, (see Figs. 2 and 4), to permit the arms 19 to pass over the nut and then overlie the same. Also, said nut 28 has projections 35 diametrically opposite or equivalent elements to determine the position of the nut so that the beveled surfaces 34 will be properly disposed to lie adjacent to the positions of the arms 19. In order to hold the bolt 28 and clamp 30 in position in the event, for example, that the bolt should break, we may provide a retaining means such as a resilient pin or spring 36 adapted to be received at one end in a socket 37 in the clamp 30, there being a slot 38 in the socket 10 above the position of the clamp 30 so that the opposite end of said spring can be passed into said slot 38 and then sprung into an undercut side 39 thereof (see Fig. 6).

We would state in conclusion that while the illustrated example constitutes a practical embodiment of our invention, we do not limit ourselves strictly to the mechanical details herein illustrated, since manifestly the same can be considerably varied without departure from the spirit of the invention as defined in the appended claims.

Having thus described our invention, we claim as new, and desire to secure by Letters Patent:

1. A drill including a drill socket having forwardly facing mortises therein, a pair of separate drill bits each having longitudinally disposed arms at the upper ends, tenons on said arms fitting said mortises, and transversely disposed fastening means positioned between and engageable with adjacent arms of the respective bits to secure the latter in position.

2. A drill of the class described including a drill socket formed with longitudinal grooves, a pair of separate drill bits slotted at their upper ends to present each a pair of arms fitting the grooves of the socket, and transversely disposed fastening means positioned between and engageable with adjacent arms of the respective bits to secure the latter to the socket.

3. A drill of the class described including a drill socket, drill bits having arms at the upper ends thereof, said socket having a formation to receive said arms, a nut on the socket in position for adjacent arms of the respective bits, to overlie said nut at opposite sides of the latter, a bolt adapted to pass transversely between said adjacent arms and engage said nut, and a clamp on the bolt beneath the head thereof outside of said adjacent arms.

4. A drill of the class described including a drill socket, a pair of bits disposed back to back, longitudinally spaced arms on said drill bits at the upper ends, there being grooves in the socket accommodating said arms, and transversely disposed clamp means adapted to engage adjacent arms of the respective bits and secure the same to the socket.

5. A drill of the class described including a drill socket, drill bits adapted at their upper ends to engage said socket, and transverse fastening means disposed between the bits, said fastening means including a clamp head outside of the drill bits, and adapted to bear against the adjacent portions of the respective bits, said adjacent portions having depressions therein to receive opposite side portions of said clamp head to effect an interengagement of the clamp head and bits.

THOMAS GORDON.
HUGH WILLIAM SIMPSON.